Nov. 17, 1925.
A. N. MERLE
1,561,941
MOTION PICTURE FILM
Filed June 1, 1925
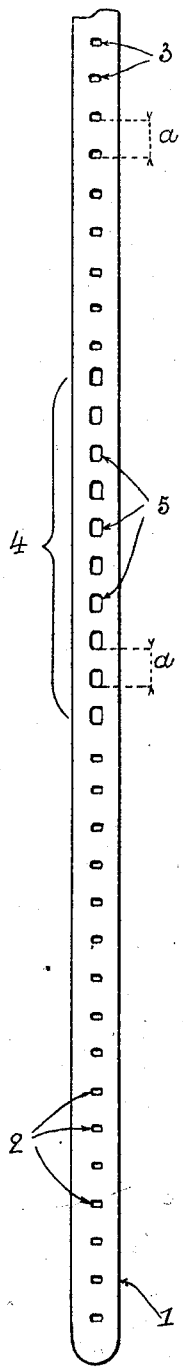
André Noël Merle
INVENTOR
By (signature)
his ATTY.

Patented Nov. 17, 1925.

1,561,941

UNITED STATES PATENT OFFICE.

ANDRÉ NOËL MERLE, OF PARIS, FRANCE, ASSIGNOR TO PATHE CINEMA ANCIENS ETABLISSEMENTS PATHE FRERES, OF PARIS, FRANCE.

MOTION-PICTURE FILM.

Application filed June 1, 1925. Serial No. 34,037.

*To all whom it may concern:*

Be it known that I, ANDRÉ NOËL MERLE, citizen of the French Republic, residing at Paris, in the French Republic, have invented new and useful Improvements in Motion-Picture Films, of which the following is a specification.

When a motion picture film is inserted in the film gate of a motion picture apparatus of the type in which the film is driven by driving claws, the perforations have an indeterminate position with reference to the claws, and thus when the driving device is set in motion, the claws will not necessarily be engaged in perforations but may enter into contact with the substance of the film at a point between two perforations. In this event, the pressing plate which applies the film against the wall of the film gate will yield to the action of the claws; the latter will move forward, pressing against the film, and will then slide upon the film until they engage perforations. But this is prejudicial to the film as well as to the claws, and the film and the claws may be damaged for this reason.

The present invention has for its object to obviate the above-mentioned inconveniences, said improvements consisting in that a certain number of the driving perforations situated upon the part of the film which comes in front of the driving claw or claws when the film is inserted in the film gate of the motion picture apparatus, have a length which is greater than that of the standard perforations in the remainder of the film, and is smaller than the stroke of the driving claw or claws.

Due to this arrangement, the space between the perforations will be diminished in the part of the film under consideration, so that the probability of the engagement of the claws in perforations will be increased to a corresponding degree.

The appended drawing shows the end of a motion picture film provided with the improvement according to the invention.

1 is the end of the film which is inserted in the film gate of the motion picture apparatus. This end comprises the perforations 2 which are the same as the standard perforations 3 formed throughout the whole length of the film; the perforations 2 are not utilized for driving the film, but are due to the continuous method of manufacture of motion picture films.

The portion of the film which is designated by the reference numeral 4 is the one which comes in front of the driving device of the apparatus when the film is inserted in the film gate of the said apparatus. The portion 4 comprises perforations 5 whose length is the maxium compatible with the proper strength of the film in this portion, the length of the said perforations being however obviously smaller than the stroke of the claws.

Inasmuch as the space between the perforations 5 is less than on the parts of the film comprising the normal perforations such as 2 and 3, the probability of the engagement of the claw in the perforations 5 will be augmented to a corresponding degree.

As shown in the drawings, the distances between the lower edges of the perforations entering into contact with the driving claw will be obviously the same throughout the entire film, this distance being indicated at *a*.

Obviously, the said invention is not limited to the form of construction hereinbefore set forth, and in particular, the film may comprise a plurality of parallel rows of perforations corresponding to a like number of claws employed in the driving device of a given motion picture apparatus, and each row may comprise a plurality of perforations upon the length of one image.

Having now described my invention, what I claim as new and desire to secure by Letters Patent is:

In a motion picture film adapted to be driven by driving claw or claws the provision, upon the part of the film intended to come in front of said claw or claws when the film is inserted in the film gate of the motion picture apparatus, of driving perforations the length whereof is greater than that of the standard perforations in the remainder of the film and is smaller than the stroke of said driving claw or claws.

In testimony whereof I have signed my name to this specification.

ANDRÉ NOËL MERLE.